June 8, 1943.  H. F. PELTZ ET AL  2,321,415

CONDUIT SYSTEM

Filed Aug. 16, 1940

INVENTORS
G. H. Zieschang and
H. F. Peltz
James E. Lynch
ATTORNEY

Patented June 8, 1943

2,321,415

UNITED STATES PATENT OFFICE 2,321,415

CONDUIT SYSTEM

Howard Frank Peltz, Millburn, and Gustav Herman Zieschang, Morristown, N. J., assignors to American Telephone and Telegraph Company, a corporation of New York Application August 16, 1940, Serial No. 352,914

7 Claims. (Cl. 174—65)

This invention relates to conduit systems, and more particularly to conduit systems which are especially adapted for installation in buildings having a plurality of floors.

It is the practice, where conduits and outlet boxes are provided for the installation of telephone or other wires in apartment houses or other buildings having a plurality of floors, to use a riser comprising a section of conduit pipe which extends from the basement to the bottom of an outlet box on the first floor and with another section of conduit pipe leading from the top of this outlet box to a similar box on the second floor, and so on, to the outlet box located on the top floor. These conduit pipes vary in size. In order to place wires in the conduit system a steel fish tape is passed through the conduit and the wires are pulled in by means of this tape. This work is accomplished by installing one or more wires at a time as additional individual stations are required. While the sections of conduit pipe connected to the tops and bottoms of the outlet boxes are in alinement, it is rather difficult to pass the fish tape from one section through the outlet box and then cause it to enter the conduit pipe directly opposite. If fishing straight through the outlet boxes cannot be accomplished, which is frequently the case, the workman must open one or more of the intermediate outlet boxes in apartments or on floors to guide the fish tape through. This operation of installing wires in conduit systems has been found to involve time-consuming operations and especially where apartments are closed and numerous visits are required before an installer can obtain access thereto.

Accordingly, it is an object of this invention to overcome the difficulties now encountered in the installation of wires in systems of the character above outlined by providing an improved arrangement for facilitating the guidance of flexible material such as fish tape and wires therethrough.

This and further objects will be apparent from the following description, when considered in connection with the accompanying drawing, in which one embodiment of the invention is illustrated.

Referring to the drawing.

Figure 1:
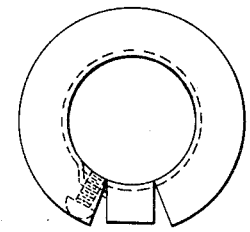
Figure 1 is a plan view of the improved device.

In the drawing, a conduit system is shown extending from a basement to a third floor for the purpose of illustration. It will be understood, of course, that this system may extend to additional floors above those indicated. The conduit system includes a plurality of sections of conduit pipe 5 extending through the several floors. The ends of the conduit pipe sections 5 enter outlet boxes 6. These ends extend a short distance into the boxes, and conduit bushings 7 and locknuts 7' are secured to these entering ends in the usual manner to maintain the sections in interconnected positions with the outlet boxes. These boxes may be of a conventional type, having spaces or spans between their walls. In the present instance the improved device 8 is applied within the box in a vertical position and lies between the top and bottom walls thereof.

Figure 2:
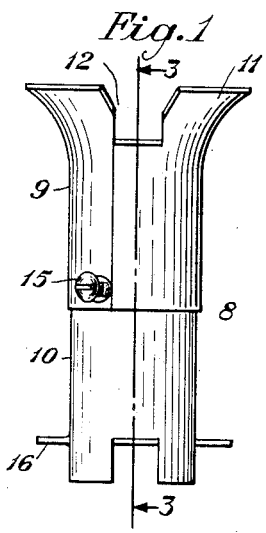
Fig. 2 is an elevation thereof.
Figure 3:
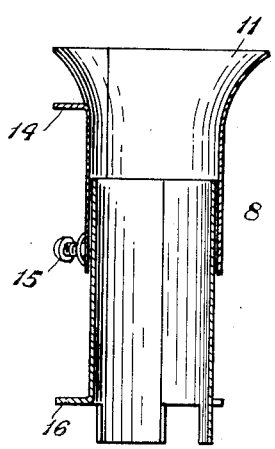
Fig. 3 is a sectional view taken on the line 3—3 of Fig. 2.
Figure 4:
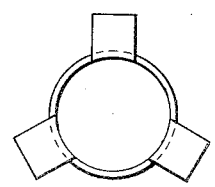
Fig. 4 is a bottom view of the improved device.
Figure 5:
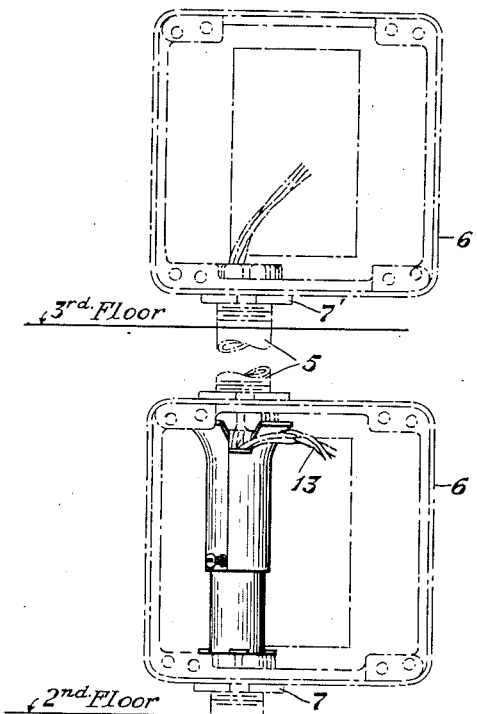
Fig. 5 is a view showing a series of outlet boxes positioned on various floors and interconnected by sections of conduit pipe which are shown as having broken-away portions.
Figure 5:
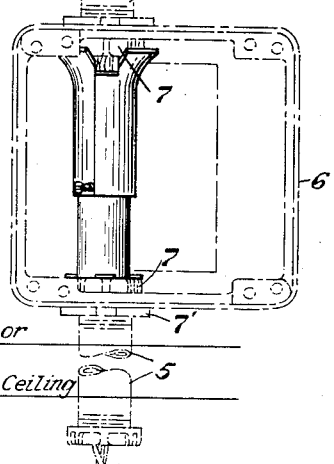

The device 8 is provided with two tubular portions 9 and 10, the portion 9 fitting over the portion 10 so that they engage each other in telescopic relation. As will appear below this telescopic relation between these members permits adjustment for dimension variations in outlet box interiors. It also permits the collapse of the top section over the bottom section in order to facilitate the use of steel fish tape and the placing of wires at intermediate box locations. This relation between said members further permits the insertion of the lower end of the bottom section into the conduit opening which results in a rigid structure when the device lies in extended position in the outlet box. The portion 9 is provided with a flared upper end 11. This flared portion 11 is adapted to engage against the conduit bushings on the ends of the pipe sections extending through the tops of the outlet box. As these pipe sections vary in diameter the flared portion compensates for the differences in the dimensions of these sections. A slot 12 is cut through the wall of the upper tubular portion 9 and extends slightly below the flared portion 11. This slot permits the wires 13 to be withdrawn from or inserted in the conduit system and outlet boxes located on any of the floors independently of, and without interference with the wires in the conduit system extending to other outlet boxes on any of the floors. This slot also provides entrance and egress for the fish tape in its operations so that access my be had to any of the intermediate outlet boxes on any of the floors of the conduit system. A lip 14 projects outwardly from the upper tubular portion 9 at the end of the slot 12. This lip provides a seat upon which the wires 13 may rest as they are withdrawn or inserted in the outlet box. This lip also serves as a projection against which the blade of a screw driver may be applied to lower or raise the telescoping tubular section 9 when the screw 15 has been loosened. The screw 15 functions as a lock to maintain the sections in adjusted positions in accordance with the various dimensions required between the inserted ends of the pipe sections entering the outlet boxes. The lower telescopic member 10 is provided with tabs 16 which are cut from the walls of the member and bent in an upward direction so that they project outwardly, as more clearly indicated in Figs. 2, 3 and 4 of the drawing. These tabs act as stops to limit the downward movement of the portion 10.

It will be obvious that by means of this invention wires or other flexible material may be readily drawn through conduits without the time-consuming operations previously necessary in this line of work. The present device also permits the insertion or withdrawal of wires at the individual outlet boxes.

Where there is shown and described herein one preferred form of the invention by way of illustration, it is understood that it is not limited or confined to the precise details of construction herein described and delineated, as modification and variation may be made within the scope of the appended claims without departing from the spirit of the invention.

What is claimed is:

1. A conduit system including an outlet box, a pair of conduits entering opposite sides of the outlet box, and an adjustable tubular member having two portions in telescopic relation to each other adapted to be extended between the opposite sides of the outlet box in alinement with the conduits, said adjustable member having a flared portion at one end to engage the adjacent conduit and thereby to compensate for differences in diameters of the conduits.

2. A conduit system including an outlet box, a pair of conduits entering opposite sides of the outlet box, and a tubular member in the outlet box in alinement with the conduits to facilitate the guidance of flexible material through the conduit system, said tubular member being composed of two portions in telescopic relation to each other and thereby adjustable one of said portions being funnel shaped so that said tubular member may be inserted in and arranged to span outlet boxes of different diameters.

3. In a conduit system including a plurality of outlet boxes having a pair of conduit sections extending between and having ends entering the top and bottom sides of adjacent boxes, a tubular member having two portions in telescopic relation to each other positioned in any one of said boxes in direct alinement with the sections to facilitate the guidance of flexible material through the conduit system, said member being adjustable so that it may be inserted in and arranged to span outlet boxes of different dimensions.

4. In a conduit system including a plurality of outlet boxes, having a pair of conduit sections extending between and having ends entering the top and bottom sides of adjacent boxes, a tubular member adjustably mounted in any one of said boxes to interconnect the conduit sections in direct alinement to facilitate the guidance of flexible material through the conduit system, said tubular member comprising two portions in telescopic relation to each other and having a flared portion at its top to compensate for differences in diameter of the conduits extending thereto.

5. In a conduit system including a plurality of outlet boxes and a pair of conduits extending between and having ends entering the top and bottom sides of adjacent boxes, said conduit system comprising a tubular member for insertion in any one of said boxes, said tubular member having telescoping portions one of which has a funnel shaped end, said portions being adjustable to interconnect the entering ends of the conduits and provide a direct path through the boxes to facilitate the guidance of flexible material through the conduit system, said tubular member having an opening therethrough for the independent insertion and withdrawal of flexible material.

6. In a conduit system adapted to be installed in buildings having a plurality of floors, a series of outlet boxes each positioned above the other on the respective floors, conduit sections having ends entering the top of one box and the bottom of a succeeding box, and a tubular member adapted to be inserted in any one of said boxes and having telescoping portions one of which is funnel shaped, said portions being adjustable for boxes of different dimensions to interconnect the entering ends of the conduit sections and provide a direct path in alinement therewith to facilitate the guidance of flexible material through the conduit system.

7. In a conduit system adapted to be installed in buildings having a plurality of floors, a series of outlet boxes each positioned above the other on the respective floors, a conduit section having ends entering the top of one box and the bottom of a succeeding box, and a tubular member adapted to be inserted in any one of said boxes and having telescoping portions one of which is funnel shaped, said portions being adjustable for boxes of different dimensions to interconnect the entering ends of the conduit sections and provide a direct path in alinement therewith to facilitate the guidance of flexible material through the conduit system, said tubular portion having an opening therethrough for the independent insertion and withdrawal of flexible material for the respective floors.

HOWARD FRANK PELTZ.
GUSTAV HERMAN ZIESCHANG.